Figure 1:
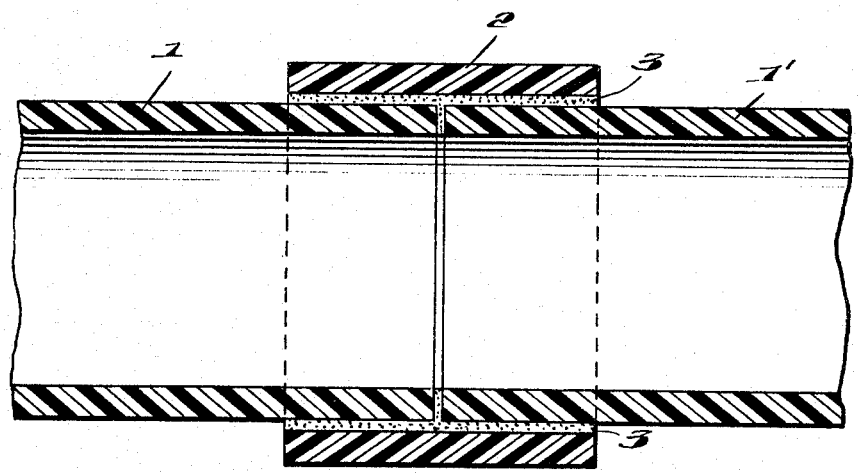

Oct. 4, 1966  H. K. P. FERCH  3,276,929
METHOD OF FORMING A SLEEVED JOINT OVER
SHAPED POLYOLEFIN BODIES
Filed Aug. 21, 1961

INVENTOR
HORST KARL PAUL FERCH,
BY Bailey, Stephens & Huettig
ATTORNEYS

United States Patent Office 3,276,929
Patented Oct. 4, 1966

3,276,929
METHOD OF FORMING A SLEEVED JOINT OVER SHAPED POLYOLEFIN BODIES
Horst Karl Paul Ferch, Hanau (Main), Germany, assignor to Deutsche Gold- und Silber-Scheideanstalt vormals Roessler, Frankfurt am Main, Germany
Filed Aug. 21, 1961, Ser. No. 132,534
Claims priority, application Germany, Aug. 20, 1960, D 34,060
6 Claims. (Cl. 156—83)

The present invention relates to an improved process for joining shaped polyolefin containing bodies, especially tubes of polyolefins, such as polypropylene, and preferably polyethylene or copolymers containing one or more of such olefins and also, for example, isobutylene with the aid of sleeves and adhesives. The joints obtained are permanent, strong and heat resistant.

Many proposals have been made for joining polyolefinic shaped bodies and particularly those of polyethylene with the aid of suitable adhesives. All of such proposals which require use of adhesives of various types, such as dispersion adhesives, reaction adhesives or contact adhesives, left much to be desired in the strength of the joints or bonds attained. It has, for example, not been possible to achieve a sufficiently high force of adhesion between the polyethylene parts joined. The force of adhesion achieved in no instance reached that of the cohesive force of the polyethylene material itself, so that the joint was always weaker than the material joined and therefore the strength of the polyethylene joined could not be fully utilized.

It furthemroe is known that tubes of low pressure polyethylene can be joined with the aid of telescoping sleeves of unplasticized polyvinyl chloride with the aid of an unsaturated polyester resin as an adhesive. In addition to the fact that such procedure requires roughening of the surface of the tubes, it also requires use of different base materials, the use of which in combination often causes difficulties because of the different properties thereof, especially, their chemical coefficients of expansion. Such method of joining gives rise to incidence of rejects and often in use the joints leaked or caused warping of the materials.

An object of the invention is to overcome these disadvantages.

It is furthemore known that curable or hardenable mixtures can be prepared from polyethylene, a peroxide, the peroxidic oxygen of which is joined directly with a tertiary carbon atom, a filler, such as carbon black, silicates, silica or aluminum oxide, and another polymer, such as organo polysiloxanes, polybutadiene, polyacrylic acid esters, polystyrene, chlorosulfonated polyethylene or mixtures of such polymers. Such mixed polymers or polymer mixtures are processed to shaped bodies by shaping and curing at about 150° C. Such bodies as compared to those of polyethylene possess a higher strength and elongation (%), even at temperatures above room temperatures.

According to the invention a method has been devised for joining shaped polyolefin bodies, especially polyethylene bodies, such as rods, lathes or tubes of round, oval or angular profile with the aid of sleeves in which the strength of the joints obtained is approximately that or even greater than that of the polyolefin bodies joined or in other words is about the same or greater than the cohesive strength of the polyolefins concerned. The sleeves employed can be formed from hollow bodies, the diameter or cross-section of which is the same or only slightly larger than that of the bodies to be joined. The preparation of the shaped bodies and the sleeves can be accomplished in the manner described in German application D 29,602.

In producing the joints according to the invention a special shaped body in the form of a sleeve or a similarly shaped body equivalent to a sleeve of a practically insoluble olefin, which, however, is still swellable, is swollen in a swelling agent for these polymers or copolymers at temperatures at least 80° C., preferably at temperatures between 120 and 200° C., and slipped over the ends of the similarly shaped bodies to be joined, the surfaces of which are to be overlapped by the sleeves are coated with a rcation adhesive. The swelling agent is then evaporated to shrink on the sleeve and the adhesive cured.

The invention is illustrated in the accompanying drawing wherein

FIGURE 1 is a sectional view of shaped bodies joined according to the process of the invention by means of a separate sleeve.

Referring to the drawing, in FIGURE 1 the two shaped bodies 1 and 1' made of cross-linked polyolefins are joined by applying a curable reaction adhesive 3 between sleeve 2 and shaped bodies 1 and 1'. The sleeve 2 is swollen by means of a swelling agent before being slipped over shaped bodies 1 and 1'. After the sleeve 2 is slipped on, then a portion of the swelling agent is evaporated to shrink the sleeve 2 on the shaped bodies 1 and 1' and the remaining portion of the swelling agent is taken up on cross-linking and copolymerization with at least one component of the reaction adhesive. The reaction adhesive is then cured thereby forming a strong, impervious joint.

Swelling agents suitable for the process according to the invention include all compounds, especially organic compounds, capable of swelling cross-linked polyolefins which contain fillers and thereby to widen or increase the volume of such polyolefins and be easily removable therefrom, such as, for example, by evaporation to reverse the swelling process. Swelling agents of this type, for example, are toluene, xylene, naphthalene, decaline, hexaline and their methyl, chloro, bromo or nitro derivatives.

An especially advantageous embodiment of the invention is one wherein a liquid is employed as a swelling agent which is subsequently available for copolymerization, that is, to be capable of being built into the polymerization product of a reaction adhesive.

In general, such swelling agents are favored as contain a reactive group, especially an ethylenically unsaturated carbon to carbon bond. Swelling agents, such as, styrene, α-methyl styrene, chloro substituted styrenes, methacrylic acid butyl-, phenyl- or benzyl-esters, vinyl toluene and similar other unsaturated polymerizable organic compounds, are advantageously used. Also, swelling agents containing two or more reactive groups, such as divinyl benzene, ethylene glycol dimethacrylate, triethylene glycol dimethacrylate, methacrylate acid allyl ester, diallyl phthalate, diallyl fumarate either alone or in combination with the other swelling agents mentioned can be employed advantageously.

The swelling agents employed must be capable of swelling the sleeves of cross-linked and filler containing polyolefin sufficiently that their inner cross-section, which is unswollen state is smaller than that of the bodies to be joined, is sufficiently large to permit the sleeves to be slipped over similar non-swollen shaped bodies to be joined of similar or the same material. The uncross-linked polyethylene would, for example, be dissolved rather than swollen by the "swelling" agent at the temperatures indicated.

The swelling of the sleeves as indicated is effected at raised temperatures. The actual temperature employed depends upon the swelling agent and the properties of the polymer employed. It is, for example, dependent upon the boiling point of the swelling agent and the spacial size of the molecules thereof. Of couse, the interior size of the sleeves in unswollen or deswollen state is smaller than that of the exterior of the bodies to be joined so that when the swelling agent is given the opportunity to evaporate after the smaller sleeves have been slipped over the ends of the bodies to be joined the sleeves will shrink on tightly.

Especially strong, impervious and permanent joints are obtained when the overlapping portions are additionally bonded with a reaction adhesive and furthermore if the swelling agent employed for the sleeve is one which combines with the reaction adhesive by copolymerization, preferably styrene or its derivatives. In such instance when the sleeve shrinks only a portion of the swelling agent escapes, the other portion being taken up by the growing and cross-linking molecule of the reaction adhesive. The best results are obtained when the polyolefin employed is a filled olefin, particularly one highly filled with carbon black.

Two component adhesives, preferably those according to German Patent No. 1,014,254, are preferred for providing the adhesive bond. However, other reaction adhesives may be employed, such as those based on monomeric polymerizable liquid compounds containing a terminal $>C=CH_2$ group, such as styrene, methyl methacrylates, which may also contain an elastomer dissolved in such monomer, as well as those based on epoxy resins, unsaturated polyesters, epoxy polyesters, phenol resins or modified phenol resins, melamine resins and other similar known hardenable resins. The reaction adhesives employed may be cold curing at room temperature or they may be such that they cure at temperatures up to 100° C. Shortly before the swollen sleeve is slipped over the ends of the shaped bodies to be joined such ends are coated with a thin layer of a reaction adhesive, for example, about 0.2 to 0.4 mm. thick with the aid of a brush shortly after both components of the adhesive are combined. As indicated above, the curing of the reaction adhesive may take place at room temperature or at temperatures up to 100° C. When curing is effected at the higher temperatures the curing time, which at room temperature may amount to 8–12 hours, shortens considerably. The heating of the joint is only necessary when a monomeric swelling agent is used alone or with other swelling agents which does not undergo copolymerization at room temperature as, for example, is the case with diallyl phthalate.

The incorporation of fillers in polyolefins is already known. High loadings in polyethylene, for example, normally tend to cause embrittlement. However, when the use of high loading with fillers is combined with cross-linking which, for example, can be accomplished with peroxides, such as those containing the peroxidic oxygen attached to a tertiary carbon atom as in dicumyl peroxide, di-tertiary butyl peroxide or cumyl-tertiary butyl peroxide, the embrittlement is eliminated to a great degree.

The fillers which can be employed in the polyolefins joined according to the invention can be natural products, such as minerals, for example, silicates, barium sulfate and siliceous chalk, as well as synthetically produced fillers.

Carbon blacks and especially flame, gas, thermal and furnace blacks have especially favorable action as fillers. Such carbon blacks may also have been subjected in some instances to special treatments, such as, for example, an oxidative treatment or have been provided with coatings of one or more polar or surface active components. The use of carbon blacks in addition to improving the hardness and tearing strength have the advantage that they provide a stabilizing action against oxidative decomposition which is promoted by ultraviolet irradiation. The carbon black can be worked into the polyolefins, for example, on or between heated rollers.

Instead of carbon blacks, other highly disperse fillers can be employed, such as, for example, metal or metalloid oxides, such as those of aluminum, titanium, zirconium, boron, iron and silicon produced from volatile compounds at high temperatures in a gas phase reaction under oxidizing or hydrolysing conditions.

The quantity of fillers which can be incorporated in the polyolefins joined according to the invention can be between 10 and 85% by weight with reference to the total mass. Such fillers must be worked into polyolefin before or at the latest during the cross-linking of the polyolefin. If the cross-linking has been completed or progressed to a far reaching degree no further filler can be worked into the polyolefin.

Cross-linking of polyolefins is known per se. The cross-linking of polyolefins in admixture with peroxides can be effected at temperatures above 80° C., preferably at 120–200° C., such as, for example, at 120–140° C. Cross-linking of the polyolefin can also advantageously be effected by irradiation, for example, with accelerated electrons either under a nitrogen atmosphere or a vacuum.

The cross-linking of the polyolefin material in the shaped bodies, for example, polyethylene tubes, can, for instance, be effected using a differential pressure process by passing the shaped tubes of the polyethylene-filler and peroxide mixture through a vulcanization chamber heated to the required temperature and then cooling. The heating can also, for example, be accomplished dielectrically using high frequency fields. The cross-linking which occurs can easily be recognized by the increase in the melting point of the polyolefin and in some instances even the disappearance of fusibility of the polyolefin. The polyolefin becomes stable against solvents upon being cross-linked.

In carrying out the process according to the invention it is of little consequence as to what type of process was employed for the preparation of the polyolefin. The process according to the invention may be applied to high pressure or low pressure polyethylene or polypropylene. Preferably, however, high pressure polyethylene is used. Advantageously, polymers or copolymers of olefinic hydrocarbons containing up to 5 carbon atoms are employed.

The following example will serve to illustrate the process according to the invention.

Example

The ends of tubes of polyethylene filled with 50% by weight of a flame black of an average grain size of about 1500 A. and cross-linked by the addition of 2% of dicumyl peroxide were joined. The tubes had an exterior diameter of 32 mm. and a wall thickness of 2.9 mm. The exterior surfaces of ends of the tubes to be joined were coated with a 0.2 mm. thick layer of an adhesive of the following composition:

|  | Percent |
|---|---|
| Monomeric styrene | 55.4 |
| Polystyrene | 37.8 |
| Divinyl benzene | 1.06 |
| Acrylic acid | 2.12 |
| Poly-2-chlorobutadiene | 2.12 |
| Finely divided silica produced in a gas phase reaction | 0.6 |
| Diisopropyl-p-toluidine | 0.69 |
| Paraffin | 0.14 |
| Hydroquinone | 0.016 | to which 3% of a hardening paste composed of 50% of benzoyl peroxide in dibutyl phthalate had been added.

A 70 mm. long section of the same polyethylene tubing as the tubes to be joined was placed in a 2 liter vessel ⅔ filled with monostyrene maintained at a temperature of 140–142° C. After about 15 minutes it had swollen so that its inner diameter had increased to about 35 mm. The swollen section of tubing was then slipped over the adhesive coated ends of the tubes to be joined and the joint permitted to set at room temperature for 30 minutes. In this period of time the swollen section of tubing had tightly shrunken on the ends of the tubes to be joined.

The polymerization of the adhesive in the joint was completed in 12 to 24 hours.

The finished joint was later subjected to a short period bursting pressure test. The tubes which were joined themselves burst at a gauge pressure of 55 atmospheres while the sleeved joint remained undamaged and tight.

I claim:
1. A method of joining shaped bodies of cross-linked polyolefins of monomers having up to 5 carbon atoms which comprises
   (a) applying a curable reaction adhesive containing at least one polymerizable component to the surface of one of the shaped cross-linked polyolefin bodies to be joined,
   (b) swelling another of the shaped bodies of cross-linked polyolefin in the form of a sleeve, which in unswollen state has an interior cross-section smaller than the exterior cross-section of the first mentioned body, in a swelling agent which contains at least one organic polymerizable monomeric substance having at least one ethylenically unsaturated carbon to carbon bond which is copolymerizable with at least one component of said reaction adhesive, until said interior cross-section is such that it can be slipped over said first shaped body to which said adhesive has been applied while said first shaped body is in unswollen state,
   (c) slipping said swollen sleeve over the surface of said first shaped body to which the adhesive has been applied while said first shaped body is in unswollen state,
   (d) evaporating a portion of said swelling agent to shrink the sleeve on the first mentioned body, the remaining portion of the swelling agent being taken up in cross-linking and copolymerization with at least one component of the reaction adhesive and
   (e) curing the reaction adhesive.

2. The process of claim 1 in which at least the shaped body in the form of the sleeve contains 10 to 85% of a filler and said sleeve is swollen with the swelling agent at a temperature of at least 80° C.

3. The process of claim 1 in which said sleeve is swollen at a temperature between 120 and 200° C.

4. The process of claim 1 in which said filler is carbon black.

5. The process of claim 1 in which said cross-linked polyolefin is cross-linked high pressure polyethylene.

6. A method of joining shaped bodies of cross-linked polyolefins of monomers having up to 5 carbon atoms which comprises
   (a) applying a curable reaction adhesive containing at least one polymerizable component to the surface of one of the cross-linked polyolefin shaped bodies to be joined,
   (b) swelling another of the shaped bodies of cross-linked polyolefins in the form of a sleeve, which in unswollen state has an interior cross-section smaller than the exterior cross-section of the first mentioned body, in a swelling agent which contains at least one monomer, copolymerizable with at least one component of said reaction adhesive, selected from the group consisting of styrene, methyl styrene, chlorostyrene, vinyl toluene, methacrylic acid butyl ester, methacrylic acid phenyl ester, methacrylic acid benzyl ester, divinyl benzene, ethylene glycol dimethacrylate, triethylene glycol dimethacrylate, methacrylic acid allyl ester, diallyl phthalate and diallyl fumarate, until said interior cross-section is such that it can be slipped over said first shaped body to which said adhesive has been applied while said first shaped body is in unswollen state,
   (c) slipping said swollen sleeve over the surface of said first shaped body to which the adhesive has been applied while said first shaped body is in unswollen state,
   (d) evaporating a portion of said swelling agent to shrink the sleeve on the first mentioned body, the remaining portion of the swelling agent being taken up in cross-linking and copolymerization with at least one component of the reaction adhesive and
   (e) curing the reaction adhesive.

References Cited by the Examiner
UNITED STATES PATENTS

| 2,498,831 | 2/1950 | Veitch | 285—423 |
| 2,739,829 | 3/1956 | Pedlow et al. | 156—294 |
| 2,925,624 | 2/1960 | Stahl et al. | 156—294 |

OTHER REFERENCES

Polythene, Renfrew and Morgan, published by Interscience, January 1960, TP 986.P 56 R 4. 2nd edition (pp. 383, 686, 687 relied on).

EARL M. BERGERT, *Primary Examiner.*

R. J. CARLSON, P. DIER, *Assistant Examiners.*